R. C. SAYER.
RAILWAY, ROAD, WATER, AND LIKE TRAFFIC SYSTEM.
APPLICATION FILED OCT. 18, 1909.

1,001,170.

Patented Aug. 22, 1911.

2 SHEETS—SHEET 2.

Inventor
Robert C. Sayer

UNITED STATES PATENT OFFICE.

ROBERT COOKE SAYER, OF REDLAND, BRISTOL, ENGLAND.

RAILWAY, ROAD, WATER, AND LIKE TRAFFIC SYSTEM.

1,001,170.  Specification of Letters Patent.  Patented Aug. 22, 1911.

Application filed October 18, 1909. Serial No. 523,216.

*To all whom it may concern:*

Be it known that I, ROBERT COOKE SAYER, a subject of the King of Great Britain and Ireland, residing at 11 Clyde road, Redland, Bristol, England, have invented certain new and useful Improvements in and Connected with Railway, Road, Water, and Like Traffic Systems, of which the following is a specification.

This invention has for its object to provide an improved transporting and transfer apparatus and system including main and auxiliary routes of travel which are traversed by main and auxiliary carriers. The routes of travel may consist of electric highways or roads, or water ways, or this system may be embodied in a system of trackage. Where the highways or trackage is employed the carriers would be in the form of vehicles and where water ways are employed the carriers would be in the form of vessels.

It is one of the primary objects of this invention to maintain in continuous operation a set of main carriers having a relatively, great, carrying, capacity in continual operation on the main route so that a relatively great quantity of goods can be transported thereby.

The carriers for the auxiliary routes will be of a relatively reduced carrying capacity and will be utilized for receiving portions of the loads of the main carriers and transferring such load portions about the auxiliary route to stations disposed thereon.

A further object and feature of this invention is to provide for coupling the auxiliary carriers to the main carriers so that portions of the load from the main carriers can be transferred to the auxiliary carriers and so that such loads from the auxiliary carriers can be transferred to the main carriers, the latter being maintained in operation and being propelled along the main route during such transfer.

The invention will be more fully described in connection with the accompanying drawings and will be more particularly pointed out and ascertained in and by the appended claims.

Figure 1:
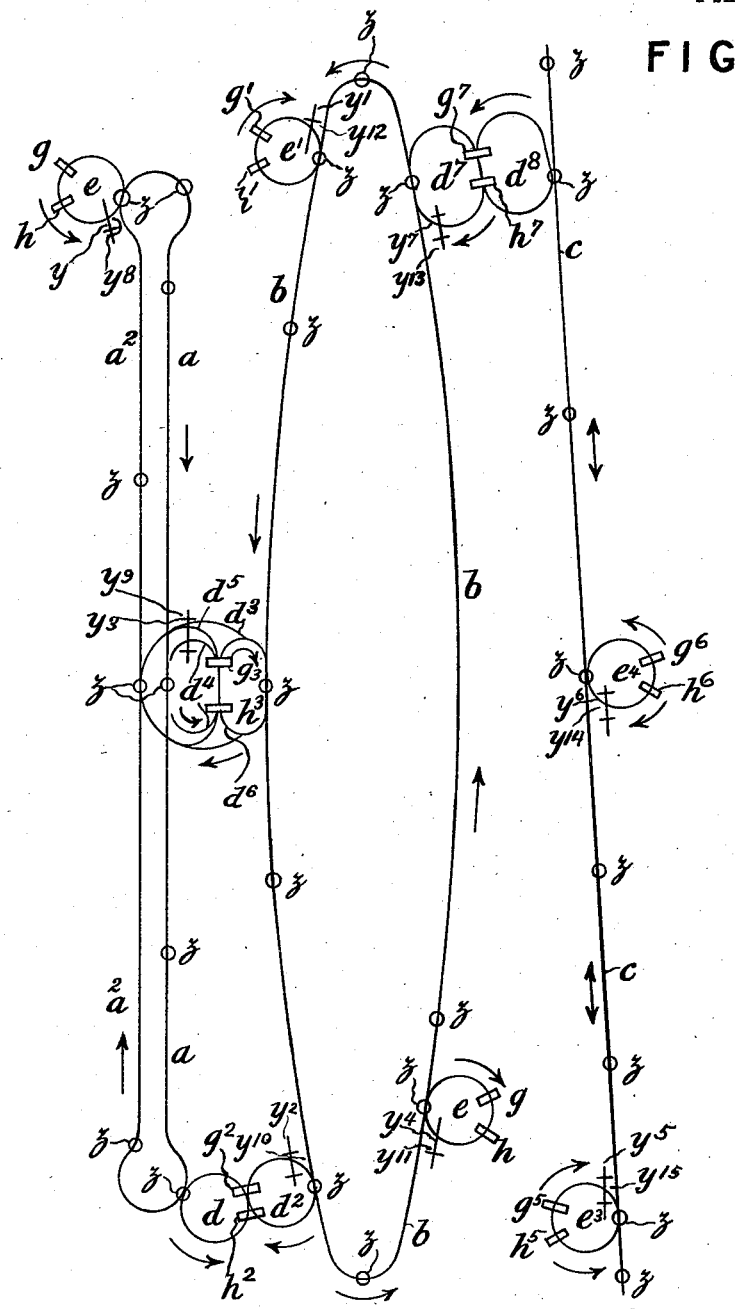
Figure 2:
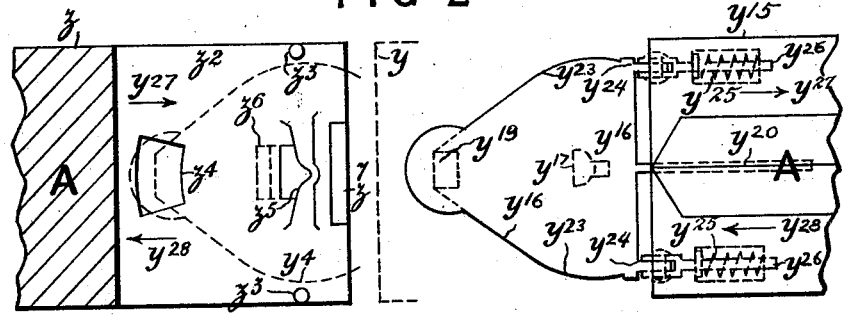
Figure 3:
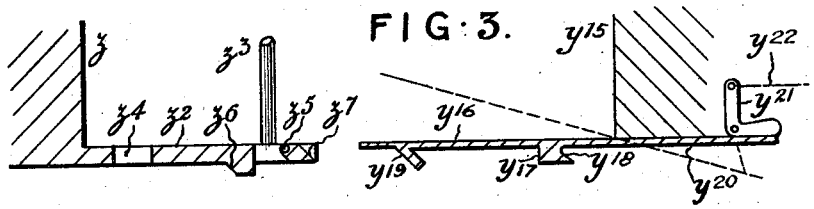
Figure 4:
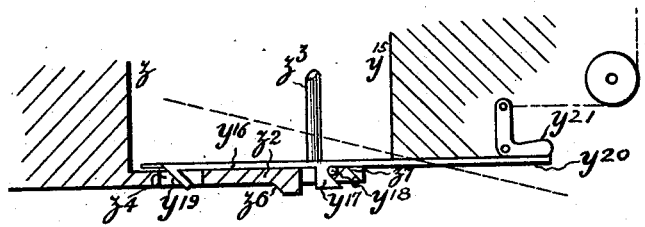
Figure 5:
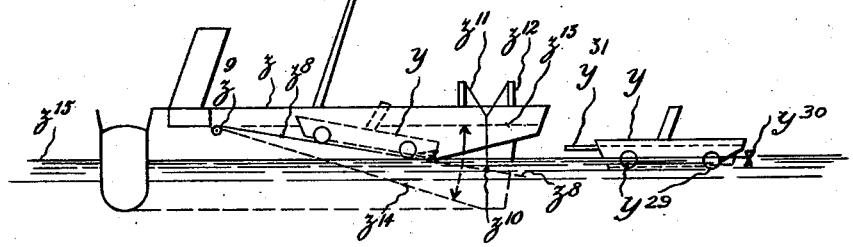

In the drawing: Figure 1, is a diagrammatic view illustrating one embodiment of my invention. Fig. 2, is a plan view, partly in section, of portions of a main and auxiliary carrier showing the coupling means with which the same is provided. Fig. 3, is a longitudinal sectional view on line A—A of Fig. 2. Fig. 4, is a similar sectional view showing the vehicles coupled together. Fig. 5, is a view showing the method of transfer from one vessel to another in cases where the invention is embodied in a water way transporting and transfer system.

Like characters of reference designate single parts throughout the different figures of the drawings.

As illustrated in Fig. 1, $a$, and $a^2$, indicate a main route consisting of a closed circuit of travel. A plurality of main carriers $z$ are preferably designed for carrying a relatively large quantity of goods. At one point of said main circuit an auxiliary circuit, $e$, is arranged and preferably joins said main circuit. As illustrated the auxiliary circuit, $e$, is also a closed endless circuit and stations $g$, and $h$, are disposed at spaced points about said auxiliary circuit $d$. A carrier $y$, is provided for traversing the auxiliary circuit $e$, and is designed for transporting goods from the stations $g$, and $h$, to a point at the juncture of the circuit $e$, with the main circuit, whereupon said carrier $y$, is coupled with such main carrier $z$, as it is passing the juncture, and portions of the loads of said carriers are transferred one from the other. During such transfer, the main carrier $z$, may be propelled at a relatively reduced speed until the auxiliary carrier is uncoupled from the main carrier whereupon the main carrier may again be advanced at its normal speed. A second main route $b$, is illustrated, and said second route also consists of an endless or closed circuit of travel over which the main carriers $z$, are advanced. The second route $b$, also joins an auxiliary route $e'$, which may also be a closed circuit of travel and in which may be included loading and unloading stations $g'$, and $h'$. A carrier $y'$, traverses the auxiliary route $e'$. Said first and second main routes may be connected by auxiliary routes $d$, and $d^2$, each of which may constitute a closed circuit, such closed circuits joining each other and one of each of said circuits joining one of the main routes. Loading and unloading stations $g^2$, and $h^2$, may be disposed within said auxiliary circuits $d$, and $d^2$. An auxiliary carrier $y^2$, may traverse both of said circuits $d$, and $d^2$, to load or unload at the stations $g$, and $h^2$, and also, to be coupled and uncoupled with and from the carrier $z$ of the main route $a$ and $a^2$, and from the carrier $z$ of the second main route $b$. Said first and second main routes may also be connected at another point by a system of auxiliary routes indicated at $d^3$ and $d^4$, $d^5$ and $d^6$. Loading and unloading stations $g^3$ and $h^3$, may be incorporated within such system of auxiliary routes. A carrier $y^3$ may be arranged to traverse such system of auxiliary routes in such a manner as to go to and from the loading and unloading stations $g^3$ and $h^3$ and to and from one portion of the second route $b$, and to and from both sides of the first route $a$ and $a^2$. An auxiliary route $e^2$, also joins the main route $b$ at one point thereon and loading and unloading stations $g^4$ and $h^4$, are disposed on such circuit $e^2$. An auxiliary carrier $y^4$, traverses the auxiliary route $e^2$. My invention may also include a third or single line route $c$, on which continuously moving main carriers $z$ are advanced. Such single line route may have provision for oppositely moving main carriers $z$, one going in one direction and the other in the opposite direction, as indicated by the arrows. An auxiliary route $e^3$, with stations $g^5$ and $h^5$, and with an auxiliary carrier $y^5$, are provided. At another point along said single main route a similar arrangement of elements $e^4$, $g^6$, $h^6$ and $y^6$ is provided.

The route $c$, may be connected with route $b$, by auxiliary routes $d^7$ and $d^8$ which join said routes and which also join each other. $g^7$ and $h^7$ designate loading and unloading stations for said auxiliary routes $d^7$ and $d^8$. A carrier $y^7$ operates on said routes $d^7$ and $d^8$.

Waiting points for the auxiliary carriers are designated at $y^8$, $y^9$, $y^{10}$, $y^{11}$, $y^{12}$, $y^{13}$, $y^{14}$, $y^{15}$. The arrows clearly show the directions in which the several carriers travel.

If the carriers are in the form of vehicles, cars or wagons, the main vehicle $z$, may be provided with a rear extension $z^2$, constituting a platform coupling member. Said extension $z^2$, or coupling member, is preferably provided with upright guides $z^3$ at opposite sides thereof. A buffer $z^6$ is arranged in front of a coupling bar $z^5$, between which an opening is formed for a purpose which will presently appear. A guide incline $z^7$ is formed on the rear end of said extension $z^2$ to raise the companion coupling member when the two vehicles are in a position to be coupled. $z^4$ is an opening to receive a portion of the coupling member of the other vehicle.

$y^{15}$ designates one of the auxiliary carriers which is provided with a hinged coupling member $y^{16}$, provided with a coupling element $y^{17}$, having an inclined portion $y^{18}$, for engagement with the coupling bar $z^5$. The front of said coupling element $y^{17}$, is arranged for engagement with the buffer $z^6$. An incline $y^{19}$, engages the incline $z^7$, to lift the coupler $y^{16}$, to the dotted line position shown in Fig. 3. The incline $y^{19}$ is disposed in the opening $z^4$ when the carriers are coupled, as shown in Fig. 4. The coupler $y^{16}$, has an extension $y^{20}$, which may be engaged by a bell crank $y^{21}$, actuated by a cord $y^{22}$, for lifting the coupler $y^{16}$ into the dotted line position shown in Fig. 3 to insure a sufficient elevation of the coupling member $y^{16}$, to raise the same above the extension $z^2$, in case there should be any variation in the relative height of adjacent portions of the carriers to be coupled. The coupler $y^{16}$ has converging side portions $y^{23}$ which engage the guide $z^3$ when the carriers are being coupled together. The coupler $y^{16}$ is hinged at $y^{24}$ to the carrier $y^{15}$ and such hinge connection is preferably yieldingly mounted and includes rods $y^{26}$ and springs $y^{25}$.

When the carriers are coupled together portions of the load of the carrier $z$ may be transferred to the carrier $y^{15}$ in the direction of arrow $y^{27}$ and usually all of the load of auxiliary carrier $y^{15}$ will be transferred to the main carrier $z$, in the direction of arrow $y^{28}$.

When the carriers are in the form of vessels, the main vessel is provided with an incline $z^8$ which may be pivoted at $z^9$ and which may be lowered by davits, ropes or chains $z^{11}$ secured at $z^{10}$. The incline $z^8$ may be raised to $z^{13}$ or lowered to $z^{14}$. $z^{12}$ indicates the davit posts. The auxiliary vessel may be provided with wheels $y^{29}$ and a propeller $y^{30}$, indicated in a general way at $y^{31}$. When the propeller has advanced the auxiliary vessel on to the incline the wheels $y^{29}$ serve to run the auxiliary vessel into the dotted line position shown in Fig. 5.

It will be understood that the main and auxiliary routes may or may not include a specially prepared way, but on the other hand, may consist of route tracks. In a large city certain streets may be utilized and selected to constitute the route tracks, or main routes, over which the main carriers are used. The main carriers will be of a large carrying capacity and will only travel on the main route tracks. These route tracks will extend to outer portions of the city in somewhat close proximity to loading and unloading stations, of the auxiliary route tracks, which join the main route tracks. Now if it were desired to transfer a small package from station $g$ of the auxiliary route track $e$ to station $g^5$ of auxiliary route track $e^3$ it would not be economical to utilize a single carrier going this distance to transfer such small package. With the apparatus and system of my invention such small package could be transferred from $g$ to $g^5$ through any of the auxiliary and main route tracks together with a number of other small or large packages. It will also be seen that while such small package is being transferred in one direction the coupling of the auxiliary and main carriers, and the exchange transfer during the coupling thereof, will enable the transfer of goods in an opposite direction. The carrier $y$ may, for instance, transfer a load of goods from station $h$ to one of the carriers $z$ and goods from the latter may also be transferred to carrier $y$ to be taken back to station $h$. It will be readily understood, therefore, that the main carriers may be constantly under operation with a relatively great load and that thereby the earning capacity of said main carriers may be utilized to substantially the maximum extent. On the other hand, the auxiliary carriers having a relatively small carrying capacity, will likewise be utilized to the full extent of their earning capacity in the transfer of minor loads to and from the loading stations and main carriers and it will thus be seen that the greatest possible efficiency of all the carriers may be constantly obtained and that the losses incident to long trips with single small packages will be entirely avoided.

In operation it will be understood that any of the auxiliary carriers, for instance carrier $y$, after leaving the loading and unloading station $h$ will traverse the auxiliary track route up to the waiting point $y^8$ and will be coupled with the first main carrier that comes along which is in position to take on more goods or to deliver goods. On the other hand if the first main carrier that comes along has no goods to be left at stations $g$ and $h$ and is loaded to its capacity, then the carrier $y$ will wait for the next main carrier $z$.

By reference to the auxiliary track routes, which connect the main track routes with each other it will be seen that any of the goods may be transferred from the main carrier $z$ of the main track route $a^2$, $a$ to main track route $b$, and from thence to main track route $c$ through the auxiliary track route $d^7$ and $d^8$.

If desired the carriers may be provided with suitable signaling devices so that when any one of the main carriers is loaded, and has no goods to deposit, it can proceed on its way without interruption.

It is believed the operation and structure of this invention will be fully understood from the foregoing and it will also be understood that I do not wish to be limited to the specific form of invention disclosed except for such limitations as the claims import.

I claim:

1. A transporting and transfer apparatus and system comprising in combination, a plurality of main track routes remote from each other and each comprising an endless or closed circuit of travel, a plurality of auxiliary routes remote from each other and joining said main routes and each comprising an endless or closed circuit of travel, stations on said auxiliary routes, main carriers traversing said main routes, and auxiliary carriers traversing said auxiliary routes for the transfer of goods from said main carriers to said stations and vice versa.

2. A transporting and transfer apparatus and system comprising in combination, a main track route consisting of an endless or closed circuit of travel, a plurality of auxiliary track routes remote from each other and each consisting of an endless or closed circuit of travel and joining said main track route, stations on said auxiliary routes, main carriers on said main route, auxiliary carriers on said auxiliary routes, and means associated with said carriers whereby the same may be coupled together for the transfer of goods from one to the other.

3. A transporting and transfer system and apparatus comprising in combination, a plurality of main track routes each consisting of an endless or closed circuit of travel, a plurality of auxiliary track routes consisting of an endless or closed circuit of travel and joining each other and the main track routes to connect the latter, main carriers on said main routes and auxiliary carriers on said auxiliary routes, and means associated with said carriers whereby the same may be coupled together to transfer goods from one route to the other.

In testimony whereof I affix my signature, in presence of two witnesses.

ROBERT COOKE SAYER. [L. S.]

Witnesses:
   E. J. FUSSELL,
   H. J. SHERRIN.